April 13, 1965  S. L. LAWRENCE ETAL  3,177,819
DIE CELL CONTROL SYSTEM FOR HAY WAFERING APPARATUS
Filed Feb. 20, 1963
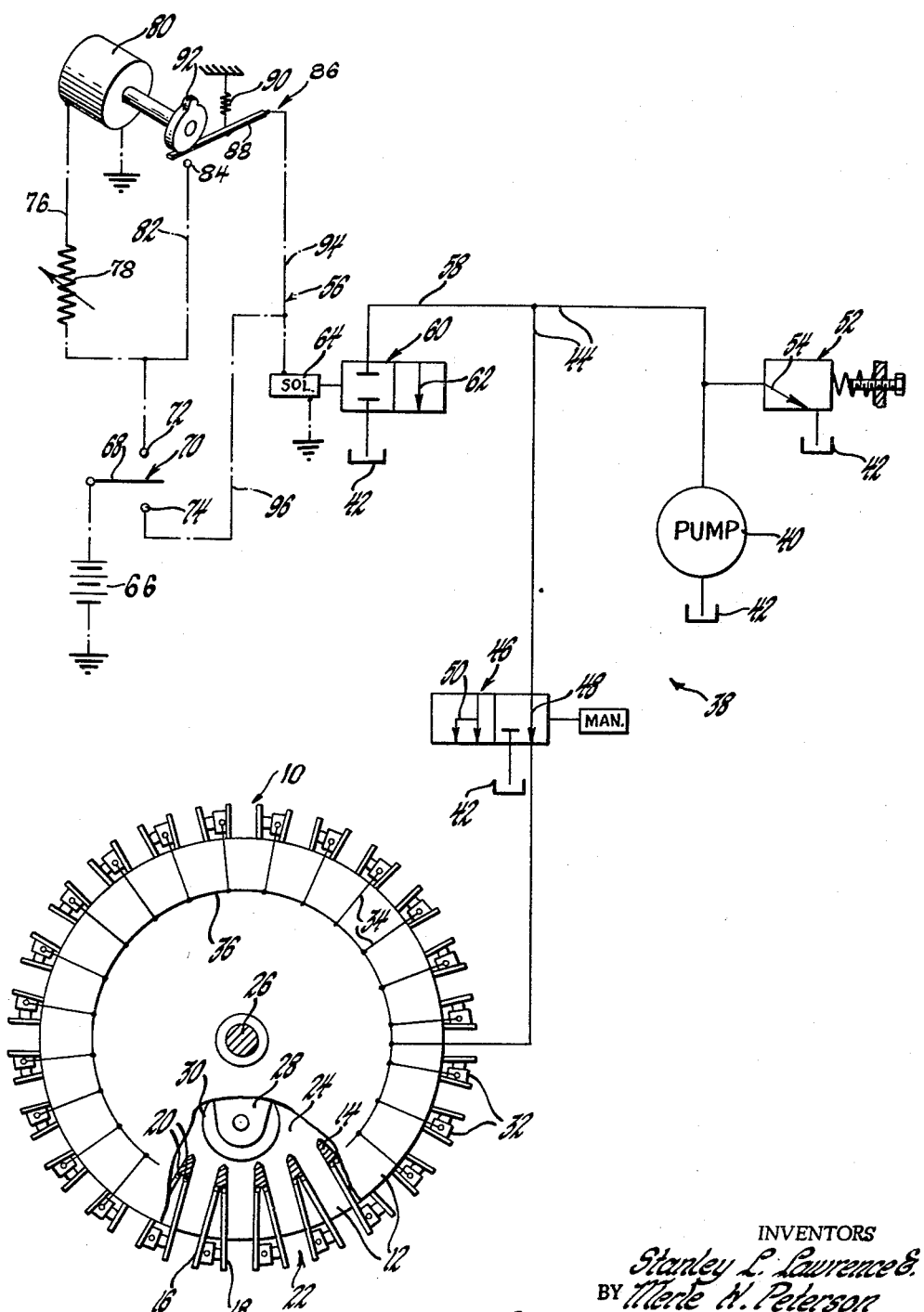
INVENTORS
Stanley L. Lawrence &
BY Merle N. Peterson
Barnard, McGlynn & Reising
ATTORNEYS United States Patent Office 3,177,819
Patented Apr. 13, 1965

3,177,819
DIE CELL CONTROL SYSTEM FOR HAY
WAFERING APPARATUS
Stanley L. Lawrence and Merle H. Peterson, Livonia,
Mich., assignors to Massey-Ferguson Inc., Detroit,
Mich., a corporation of Maryland
Filed Feb. 20, 1963, Ser. No. 259,945
15 Claims. (Cl. 107—14)

This invention relates to an apparatus for producing compressed hay wafers and, in particular, to an apparatus for field wafering forage crops into hay wafers which is particularly characterized by means for automatically changing the disposition of the die cells of the wafering apparatus at predetermined time intervals to provide a more uniform flow of hay therethrough.

In recent times, apparatus have been devised for field wafering forage crops into hay wafers comprising means for supplying hay, preferably preconditioned or processed, finely chopped, mixed and blended hay from a windrow within a field, to a hopper communicating with a wafering chamber at one end thereof which, in turn, communicates with the entrance ends of an annular series of axially open die cells, each of which is of variable converging cross sectional area from its entrance end to its exit end. Hydraulically operated motor assemblies have been associated with opposite movable walls of each of the die cells to adjust the variable cross sectional areas thereof to a substantially uniform extent and, hence, the resistance to an extrusion of hay being compressed therethrough. Rotary hay compaction or compression means has also been provided for compacting or compressing hay received within the wafering chamber into and through the die cells. As a result, as the apparatus moves through a field of mown hay, a continuous extrusion of compressed or compacted hay emerges from the exit ends of the respective die cells, and each extrusion is adapted to be engaged with an injection means adjacent the exit end of the associated die cell to break the respective extrusions of hay into hay wafers which then preferably fall upon conveyor means for removal from the apparatus.

In an apparatus of the type aforementioned, and with a suitable source supplying fluid at an adjustable and pre-selectable control pressure to the aforementioned motor means to adjust the convergent cross sectional areas of the latter to some pre-selected substantially uniform extent as aforementioned, it often happens for one reason or another, such as simply the fact that unequal amounts of hay are available within the wafering chamber for compression through respective ones or groups of the die cells, that a pause occurs in the flow of hay being compressed through various ones of the respective die cells. When such pauses occur, apparently the heat generated within the die cells by the wafering apparatus at least partially dries the hay causing it to stick within the die cells. Hay then tends to clog or build up within the affected die cells resulting in choking, partially or wholly, the flow of hay being compressed therethrough as the rotary hay compression means aforementioned continues to attempt to compress hay into and through the die cells. As a consequence, a non-uniform rate of flow of compressed extrusions of hay occurs through the respective die cells which is, of course, highly undesirable during operation of the wafering apparatus, and the aforementioned choking action imposes greater and greater loads on the engine driving the rotary hay compression means and the choking action and the loads imposed thereby often become severe enough to cause the engine to stall, which is likewise highly undesirable.

In view of the foregoing considerations, the present invention contemplates an improved apparatus of the general type aforementioned including a series of axially open die cells each being adjustably convergent in cross sectional area between axially opposite entrance and exit ends thereof, the entrance ends of such series of die cells being disposed opposite hay compaction or compression means for compacting or compressing hay into and through the die cells to form wafers, and is particularly characterized by means for automatically adjusting the convergent cross sectional areas of the die cells at predetermined time intervals to prevent the aforementioned choking action, thereby providing a more uniform rate of flow of hay through the die cells than heretofore achieved and preventing stalling of the engine driving the rotary hay compaction or compression means aforementioned.

More specifically in this regard, the invention is particularly characterized by the fact that the aforementioned means for automatically adjusting the convergent cross sectional areas of the respective die cells is adapted to operate automatically at adjustable predetermined time intervals to alternately permit opening of the convergent cross sectional areas of the die cells, as hay is forced therein for a short duration relative to initial positions thereof and then return them to such initial positions to prevent any tendency of the aforementioned choking condition from occurring and the deleterious consequences thereof as aforementioned.

In its more specific aspects, the invention is particularly characterized by a control system for the aforementioned die cells comprising a source of fluid under an adjustable and pre-selectable control pressure, supply conduit means communicating said source and such control pressure with the aforementioned fluid motor assemblies to initially adjust the cross sectional areas of the respective die cells to a substantially uniform extent for the wafering operation, exhaust conduit means including control valve means communicating with such motor assemblies, such control valve means being movable between a first position preventing flow of fluid through the exhaust conduit means and a second position permitting such flow therethrough, and means including timer motor means for automatically alternately moving the control valve means between its positions to alternately relieve and reapply the control pressure from and to the motor assemblies to automatically alternately permit an increase in and then decrease the convergent cross sectional areas of the respective die cells, thereby resulting in a more uniform rate of flow of hay being wafered from the die cells, and prevention of deleterious clogging or choking of the die cells and consequent stalling of the engine.

In addition, the invention is further characterized by manually operable overcontrol means having multiple positions including a position completely deactivating the aforementioned control valve means to prevent automatic operation thereof as aforedescribed, a poistion activating the aforementioned control valve means for automatic operation thereof, and a third position again deactivating the control valve means to prevent automatic operation thereof while directly activating it to permit an increase in the areas of the die cells as hay is forced therein for the purposes aforementioned.

In order to facilitate an understanding of the invention, a preferred embodiment thereof will now be described with reference to the accompanying drawing in which:

The sole figure in the drawing is primarily a schematic illustration of a known hay wafering apparatus equipped with a preferred embodiment of the die cell control system of the present invention.

As aforementioned, the sole figure of the drawing is primarily schematic in nature in view of the fact that the specific construction of the wafering apparatus or, in other words, those components thereof which pick up, feed and compress or compact hay into and through the die cells, in and of themselves form no part of the present invention and may take several forms which are known and commercially available in the art. Therefore, in order not to obscure the invention, the die cell construction of one such known type of wafering apparatus has been illustrated somewhat schematically in the drawing in conjunction with a control system for controlling the operation thereof to prevent a clogging or choking condition of the hay therewithin during the wafering operation to thereby provide a more uniform rate of flow of hay therethrough, and to prevent stalling of the engine driving the rotary hay compression means. On the other hand, reference may be made to the copending United States patent application, Serial No. 235,471, entitled "Hay Wafering Method and Apparatus" and filed November 5, 1962 in the name of Stanley L. Lawrence for a more detailed description of one type of wafering apparatus with which the present invention may be utilized.

Referring now to the drawing, the numeral 10 generally indicates a wafering apparatus of the type including a pair of oppositely relatively closely spaced annular plate-like end die wall members 12, and an annular or circumferentially spaced series of knife edges 14 which extend between and have their opposite ends fixedly secured to the end die wall members 12 a suitable distance radially inwardly from the outer peripheries thereof. An annular or circumferentially spaced series of pairs of side die wall members 16 and 18 are disposed between the end die wall members 12, and have their radially inner ends suitably pivotally connected as indicated at 20 to the radially outer edges of the respective knife edges 14 and diverge radially outwardly from such connections to form an annular or circumferentially spaced series of axially open die cells indicated generally at 22 between end die wall members 12 and respective oppositely spaced and radially outwardly convergent side die wall members 16 and 18 of an adjacent pair thereof.

The die wall construction aforedescribed defines therebetween a wafering chamber indicated at 24. A rotary hay compression or compaction means comprises a drive shaft 26 suitably rotatably mounted relative to and extending between the end die wall members 12 substantially centrally of the annular series of die cells 22, and the radially extending arm means 28 having its central portion suitably rigidly secured to the drive shaft for rotation therewith within the wafering chamber 24, and rotatably journaling at the opposite ends thereof a pair of compaction or compression rollers 30, only one of which being shown in the drawing. The drive shaft 26 is adapted to be suitably coupled to, as by means of a pulley system, and driven by the usual internal combustion engine associated with such an apparatus but not shown in the drawing.

At this juncture, it may be noted that the rollers 30 are positioned so as to be closely spaced to but not engage the knife edges 14 and the entrance ends to the respective die cells 22 disposed opposite the rotary path of travel of the rollers. Thus, hay may be picked-up in a continuous fashion, preferably from a windrow within a field by any one of the well known crop pick-up mechanisms, and delivered into a known hopper construction communicating with the wafering chamber 24 from which it is fed, as by a multiple flight feed auger disposed in the aforementioned hopper, continuously into the wafering chamber 24 and laid across the knife edges 14 and the entrance ends of the respective die cells in advance of the rotative path of travel of the rollers 30. The rollers, upon successive rotative passes thereof, act to force the hay past the knife edges and compact and compress it into and through the respective die cells to result in extrusions of hay emerging from the exit ends of each of the die cells. Preferably, and again as is known in the art, such extrusions of hay engage ejection plates or other ejection means at the exit ends of the respective die cells, so as to break the respective extrusions to form wafers which then fall from the wafering apparatus preferably into a conveyor mechanism for removal therefrom.

During normal wafering operations, the cross sectional areas of the respective die cells preferably converge radially outwardly from the entrance ends toward the exit ends thereof due to the fact that the respective oppositely disposed side die wall members 16 and 18 forming a part of each die cell converge in this manner. In order to adjust the degree of convergence of the cross sectional areas of each of the die cells, an hydraulically operated motor assembly 32 of the type comprising relatively reciprocable piston and cylinder elements is interposed between each hinged pair of side die wall members 16 and 18 to control their angular relationship about their hinge points 20. Each of the motor assemblies 32 is individually connected by a conduit 34 to a common fluid manifold 36 adapted to be supplied with fluid under pressure in a manner to be described to control the convergent cross sectional areas of the respective die cells during the wafering operation.

Referring now to the system for controlling the convergent cross sectional areas of the respective die cells 22, the numeral 38 generally indicates a primary control system comprising a suitable pump 40 drawing fluid from a reservoir 42 and supplying it under pressure to the supply conduit 44 which communicates through the conventional manually operable selector valve 46 including passageway means 48 and 50 with the manifold 36 and, hence, with each of the motor assemblies 32. A conventional manually adjustable spring-biased pressure regulator valve 52 including passageway means 54 is connected to the delivery side of the pump 40 whereby, by adjusting the spring pressure of the regulator valve and shifting of the latter to the right in the drawing to connect passageway means 54 with the reservoir in the usual manner, any desired pump delivery or control pressure can be selected for supply through the supply conduit 44 and manual selector valve 46 to the manifold 36, resulting in angular adjustment of the respective side die wall members 16 and 18 to a substantially uniform extent and, hence, an initial preselected substantially uniformly convergent cross sectional area for each of the respective die cells 22 between their entrance and exit ends. As will be readily apparent, in the normal position of the manually operable selector valve 46 as illustrated in the drawing, fluid at the aforementioned pre-selected delivery or control pressure is supplied by the pump through supply conduit 44 and valve passageway means 48 to manifold 36 and motor assemblies 32 for the purpose immediately aforementioned. On the other hand, the selector valve may be shifted to the right in the drawing to communicate the supply conduit 46 through valve passageway means 50 to the reservoir 42 and thereby dump the pump and relieve the pre-selected control pressure initially applied to the motor assemblies 32 to permit the respective side die wall members 16 and 18 of each pair thereof to hinge toward each other as hay is forced into the die cells and thereby increase the convergent cross sectional areas of the respective die cells 22.

A secondary control system is indicated generally at 56 and comprises the exhaust conduit 58 communicating with the supply conduit 44 and the reservoir 42 through the conventional control valve 60 including passageway means 62. The control valve is normally disposed in the position illustrated in the drawing in which it prevents communication of fluid pressure from the supply conduit 44 through the exhaust conduit 58 to the reservoir, and is movable to a second position to the left in the drawing placing the exhaust conduit in communication with the reservoir through valve passageway means 62 to dump pressure from the supply conduit 44 thereto. The position of the control valve is automatically controlled by energization and de-energization of a conventional electrically operated device such as the solenoid 64 forming part of an electrical control circuit including the source of electrical power indicated at 66 and connected to the manually movable switch arm 68 of a selector switch 70 further including the two contacts 72 and 74. The contact 72 is connected through a motor circuit including lead 76 and the adjustable variable resistance means 78 to the electrical timer motor 80 and ground as indicated, and is also connected in parallel through a switch circuit including lead 82 and contact 84 of control switch 86 including movable switch member 88 normally biased out of engagement with contact 84 by spring 90 in the usual manner. The output shaft of the timer motor 80 rotatably drives the timer cam 92 riding on switch member 88 to alternately engage and disengage the latter with contact 84 in concert with the action of spring 90. Lead 94 connects switch member 88 to solenoid 64 and ground and lead 96 similarly connects selector switch contact 74 through lead 94 to the solenoid.

In operation, it may be assumed that the operator of the wafering apparatus has adjusted the regulator valve 52 in accordance with various wafering conditions encountered at a particular time to provide a pre-selected delivery or control pressure for the fluid supplied by the pump 40 to the supply conduit 44 and, with the manually operated selector valve 46 in the position illustrated in the drawing, fluid under such pressure is thereby supplied to the manifold 36 and, hence, through the individual conduits 34 to the respective motor assemblies 32 to initially dispose the side die wall members 16 and 18 in position to provide substantially uniform convergence of the areas of the respective die cells 22 between the entrance and exit ends thereof. Thereafter, hay to be wafered is fed to the wafering chamber 24 as aforedescribed and the usual engine coupled to the rotatable drive shaft 26 drives the latter to propel the rotary hay compression means including the rollers 30 in successive rotary paths to compress and compact the hay into and through the respective die cells. At any time desired, and irrespective of operation of the secondary control system 56, the vehicle operator merely by manually shifting the selector valve 46 to the right in the drawing, can dump the supply conduit 44 and the aforementioned control pressure through passageway means 50 to the reservoir, thereby permitting the cross sectional areas of the respective die cells to increase as hay is forced therein to alleviate any clogging or choking action occurring therein.

On the other hand, with the selector valve 46 disposed in its normal operating position as shown in the drawing, the switch arm 68 of control switch 70 may be closed on contact 72 to activate the timer motor 80 through the motor circuit means including lead 76 and variable resistance means 78, and also to activate the control switch 86 through the switch circuit means including lead 82, contact 84, switch member 88 and lead 94. As a result, the timer motor 80 continuously rotates the timer cam 92 at a predetermined speed determined by the setting of the variable resistance means 78 and, during each cycle of rotation of the timer cam 92, the control switch 86 is alternately closed for a predetermined relatively short duration and then opened for a relatively longer duration as determined by the contour of the timer cam 92 due to the make-break action of the switch member 88 relative to the contact 84. Consequently, during such alternate making and breaking of the switch control circuit to the solenoid 64, the control valve 60 is alternately moved to the left in the drawing for a relatively short duration and then automatically returned to the normal position illustrated in the drawing to alternately connect and disconnect the supply conduit 44 to the reservoir 42 through the control valve 60 to alternately relieve and then reapply the control pressure to the motor assemblies 32. Therefore, in the final analysis, the convergent cross sectional areas of the die cells 22 are permitted to increase for a short duration, and are then returned to their initially selected areas upon reapplying the control pressure thereto. As a result of such alternate changes in the areas of the die cells at predetermined timed intervals, the tendency of a choking or clogging condition to occur in any one or groups of the die cells is substantially eliminated, thereby providing a more uniform rate of flow of hay through the respective die cells than heretofore achieved and preventing stalling of the engine driving the rotary hay compaction or compression means including the drive shaft 26. In this regard, it will now be apparent that the operator of the wafering apparatus will adjust the variable resistance means 78 to provide any particular predetermined time interval required for operation of the control valve 60 in accordance with the particular wafering conditions encountered at any particular time.

With the movable switch arm 68 of the selector switch 70 disposed in its neutral position out of engagement with either contact 72 and 74 as illustrated in the drawing, it will be quite evident that the aforedescribed circuit means are completely deactivated to prevent energization of the solenoid 64 and shifting of the control valve 60 to the left under any circumstances. On the other hand, the operator of the apparatus may manually position the switch arm 68 in current-conducting relation with the contact 74 at which time the solenoid 64 is directly actuated through lead 96 to shift the control valve 60 to the left as aforedescribed, while the respective motor circuit means and control switch circuit means through the timer motor 80 and control switch 86 remain deactivated.

The embodiments of the invention in which an exclusive property or privilege is claimed are defined as follows:

1. In an apparatus for making compressed hay wafers, and of the type including a series of die cells each being adjustably convergent in cross sectional area between entrance and exit ends thereof, the entrance ends of said die cells being disposed opposite compression means for compressing hay into and through said die cells to form wafers; the improvement comprising means for automatically adjusting in response to hay being compressed therein the convergent cross sectional areas of said die cells at predetermined time intervals.

2. In an apparatus for making compressed hay wafers, and of the type including a series of die cells each being adjustably convergent in cross sectional area between entrance and exit ends thereof, the entrance ends of said die cells being disposed opposite compression means for compressing hay into and through said die cells to form wafers; the improvement comprising means for automatically increasing in response to hay being compressed therein the convergent cross sectional areas of said die cells at predetermined time intervals.

3. In an apparatus for making compressed hay wafers, and of the type including a series of die cells each being adjustably convergent in cross sectional area between entrance and exit ends thereof, the entrance ends of said die cells beig disposed opposite compression means for compressing hay into and through said die cells to form wafers; the improvement comprising means operable automatically at predetermined time intervals alternately increasing in response to hay being compressed therein and decreasing the convergent cross sectional areas of said die cells.

4. In an apparatus for making compressed hay wafers, and of the type including a series of die cells each being adjustably convergent in cross sectional area between entrance and exit ends thereof, and a plurality of fluid pressure operated motor means operating upon said die cells to control the convergent cross sectional areas thereof, the entrance ends of said die cells being disposed opposite hay compression means for compressing hay into and through said die cells to form wafers; the improvement comprising primary control means for supplying fluid under a pre-selected control pressure to said motor means to substantially uniformly initially adjust the convergent cross sectional areas of said die cells, and secondary control means for automatically alternately relieving and reapplying said control pressure from and to said motor means at predetermined time intervals to respectively alternately permit an increase in the convergent cross sectional areas of said die cells from the initial position thereof as hay is compressed therein and return the areas of said die cells to the initial positions thereof.

5. In an apparatus for making compressed hay wafers, and of the type including a series of axially open die cells each including axially opposite entrance and exit ends and opposed movable wall means extending therebetween to adjustably vary the convergent cross sectional area thereof between said entrance and exit ends, a plurality of fluid pressure operated motor means respectively operatively connected between said wall means of each adjacent pair of die cells of said series thereof and being operable to control the convergent cross sectional areas of said die cells, and fluid manifold means communicating with each of said motor means, the entrance ends of said die cells being disposed opposite hay compression means for compressing hay into and through said die cells to form wafers; the improvement comprising a source of fluid under a pre-selectable control pressure, supply conduit means communicating said source with said manifold means, exhaust conduit means including control valve means communicating with said manifold means, said control valve means being movable between a first position preventing flow of fluid through said exhaust conduit means and a second position permitting flow of fluid therethrough, and means for automatically moving said control valve means to said second position thereof at predetermined time intervals to relieve said control pressure from said manifold means and permit an increase in the convergent cross sectional areas of said die cells as hay is compressed therein.

6. In an apparatus for making compressed hay wafers, and of the type including a series of axially open die cells each including axially opposite entrance and exit ends and opposed movable wall means extending therebetween to adjustably vary the convergent cross sectional area thereof between said entrance and exit ends, a plurality of fluid pressure operated motor means respectively operatively connected between said wall means of each adjacent pair of die cells of said series thereof and being operable to control the convergent cross sectional areas of said die cells, and fluid manifold means communicating with each of said motor means, the entrance ends of said die cells being disposed opposite hay compression means for compressing hay into and through said die cells to form wafers; the improvement comprising a source of fluid under a pre-selectable control pressure, a supply conduit means communicating said source with said manifold means, exhaust conduit means including control valve means being movable between a first position preventing flow of fluid through said exhaust conduit means and a second position permitting flow of fluid therethrough, and means operable automatically at predetermined time intervals for alternately moving said control valve means between said positions thereof to alternately relieve and reapply said control pressure from and to said manifold means.

7. The apparatus according to claim 6 wherein said means operable automatically at predetermined time intervals comprises an electrically operated valve operator operatively connected to said control valve means, electrical switch circuit means including control switch means connected to said valve operator, said control switch means being movable between a first position opening said circuit means to de-energize said valve operator and dispose said control valve means in said first position thereof and a second position closing said circuit means to energize said valve operator and move said control valve means to said second position thereof, and timer motor means operatively connected to said control switch means for automatically moving the latter between said positions thereof at predetermined time intervals.

8. The apparatus according to claim 7 wherein said switch circuit means further comprises manually operable selector switch means having a neutral position deactivating said switch circuit means, a second position activating said switch circuit means through said control switch means, and a third position deactivating said switch circuit means through said control switch means and energizing said valve operator.

9. The apparatus according to claim 7 wherein said said supply conduit means further comprises manually operable selector valve means movable between a first position communicating said source with said manifold means and a second position relieving said control pressure therefrom.

10. The apparatus according to claim 7 wherein said source of fluid under a pre-selectable control pressure comprises pump means supplying fluid under pressure to said supply conduit means, and adjustable pressure regulator valve means for pre-selecting the delivery pressure of said pump means.

11. The apparatus according to claim 7 further comprising motor circuit means, and wherein said timer motor means is electrically driven and connected in said motor circuit means.

12. The apparatus according to claim 11 wherein both said switch and motor circuit means further comprise common manually operable selector switch means having a neutral position deactivating both said circuit means, a second position activating both said circuit means respectively through said control switch means and motor means, and a third position deactivating both said circuit means respectively through said control switch means and motor means and energizing said valve operator.

13. The apparatus according to claim 11 further comprising variable resistance means in said motor circuit means to vary the speed of operation of said timer motor means and said predetermined time intervals.

14. In an apparatus for making compressed hay wafers, and of the type including a plurality of die cells each being adjustably convergent in cross sectional area between entrance and exit ends thereof, the entrance ends of said die cells being disposed opposite means for compressing hay into and through said die cells to form wafers; the improvement comprising means for automatically simultaneously adjusting the convergent cross sectional areas of all of said die cells at predetermined time intervals as hay is compressed therein.

15. In an apparatus for making compressed hay wafers, and of the type including a plurality of die cells each being adjustably convergent in cross sectional area between entrance and exit ends thereof, the entrance ends of said die cells being disposed opposite means for compressing hay into and through said die cells to form wafers; the improvement comprising means for simultaneously automatically increasing the convergent cross sectional areas of all of said die cells at predetermined time intervals as hay is compressed therein.

References Cited by the Examiner

UNITED STATES PATENTS 1,490,162   4/24   Dow.
3,070,006   10/62  Raney et al. _____ 100—192

FOREIGN PATENTS 1,250,174   11/60  France.

OTHER REFERENCES

Pages 36 and 39, 4/61, Western Livestock Journal.
Pages 412–415 and 423, 8/61, Agricultural Engineering.

WALTER A. SCHEEL, *Primary Examiner.*